Oct. 17, 1933. H. J. HODSMAN ET AL 1,931,408
WASHING OF FLUE GASES FROM COMBUSTION FURNACES AND THE LIKE
Filed May 27, 1931
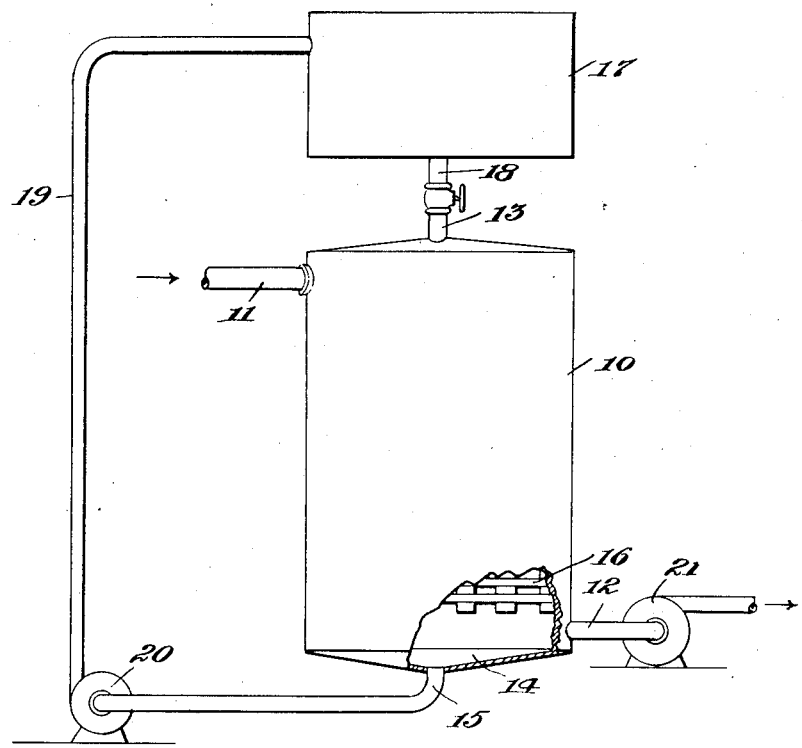
Inventors:
Henry J. Hodsman
and Alan Taylor,
by
Att'ys.

Patented Oct. 17, 1933

1,931,408

UNITED STATES PATENT OFFICE 1,931,408

WASHING OF FLUE GASES FROM COMBUSTION FURNACES AND THE LIKE

Henry James Hodsman, Headingley, and Alan Taylor, Hull, England, assignors to W. C. Holmes and Company Limited, Huddersfield, England, a British company Application May 27, 1931, Serial No. 540,404, and in Great Britain May 30, 1930

14 Claims. (Cl. 23—119)

This invention relates to the treatment of flue gases from combustion furnaces and the like which contain oxides of sulphur.

The products of combustion from combustion furnaces such as those of steam boilers generally contain a proportion of sulphur, in the form of oxides, derived from the fuel consumed. The oxides of sulphur generally consist mainly of sulphur dioxide but sulphur trioxide may be present, depending upon the conditions of operation.

Where the furnace installation is large the quantity of oxides of sulphur carried off by the gases of combustion effects serious atmospheric pollution. One object of the present invention is to treat such gases prior to their discharge into the atmosphere so as to eliminate as completely as possible the oxides of sulphur. Another object is to enable oxides of sulphur to be removed from flue gases and recovered in a useful form. A further object is to provide a process which will enable large volumes of flue gases to be treated in a relatively small space and stripped of their content of oxides of sulphur so that they may be delivered to the atmosphere in an unobjectionable condition.

It has now been observed that the removal of even small traces of oxides of sulphur from flue gases and even when such gases are hot can be effected to a very complete extent by means of absorption in ammonia, and that the ammonium sulphite produced is rapidly and continuously oxidized, in part at least, to sulphate of ammonia by the oxygen contained in the flue gases. The proportion of sulphur dioxide contained in the flue gases is generally quite small, for example less than 0.1% by volume, but it has been found that quantities even of this order can be practically completely eliminated by the method of the present invention.

The flue gases generally contain somewhere about 8% of free oxygen and it has been found in practice that, provided an effective catalyst is employed, the oxidation of the ammonium sulphite to sulphate of ammonia can be effected practically entirely by means of the free oxygen contained in the flue gases. Even in absence of added catalyst a substantial proportion, for example up to about 70%, of the ammonium sulphite is oxidized quite rapidly by the oxygen contained in the flue gases. The dust carried by the flue gases may possibly exert a catalytic influence.

The process can be carried out by continuously passing the flue gases through a chamber and continuously passing an aqueous solution containing free ammonia through the chamber in contact with such gases whereby substantially the whole of the oxides of sulphur contained therein are neutralized, the sulphur dioxide forming ammonium sulphite which is partly or completely oxidized to sulphate of ammonia by the oxygen contained in the gases.

While it is necessary for the aqueous solution to contain free ammonia and thus possess an alkaline reaction when brought into contact with the flue gases, it is desirable, if loss of ammonia with the treated gases is to be avoided, to ensure that the solution passing out of contact with the treated gases shall have a slightly acid reaction. The acidity should therefore correspond to a pH value below 7. A pH value of 6 is suitable and it has been found that at this acidity, and with a low concentration of ammonium sulphite in the liquor, substantially no sulphur dioxide is returned to the treated gases even at a temperature of 50° C.

The process is therefore preferably carried out by so correlating the quantity of free ammonia in the aqueous solution, the quantity of oxides of sulphur contained in the flue gases, and their rates of passage through the chamber that the oxides of sulphur are substantially completely removed while the solution passing out of the chamber is slightly acid, whereby escape of ammonia with the treated flue gases is avoided.

A further important feature of the invention consists in causing an aqueous solution containing sulphate of ammonia and free ammonia to flow in co-current contact with the flue gases. The flue gases are thus substantially completely freed from oxides of sulphur and are removed from contact with the aqueous solution when such solution no longer contains free ammonia. Free ammonia can then be added to the aqueous solution which is again caused to flow in co-current contact with further flue gases.

A suitable source of ammonia for use in the process is crude ammonia liquor which is a by-product in the distillation of coal and contains about 2% of free ammonia together with a proportion of fixed ammonia and impurities. The ammonia produced by the distillation of such crude liquor with lime or ammonia from other sources, e. g. synthetic processes, may also be used. When the aqueous solution brought into contact with the flue gases consists of crude ammonia liquor, the liquor so treated may be used for any desired object where a solution of fixed ammonia can be employed, e. g. the indirect process for the production of sulphate of ammonia, since the free ammonia is merely converted to fixed ammonia without substantial loss by bringing it into contact with flue gases. Moreover, by the evaporation which takes place the volume is simultaneously reduced and this constitutes a further advantage. Although the crude ammonia liquor contains sulphides and so liberates hydrogen sulphide on acidification, this hydrogen sulphide appears to be completely destroyed under the conditions of operation so that the treated flue gases may be discharged to the atmosphere without causing a nuisance.

When the oxidation of the ammonium sulphite has not been completed by the oxygen contained in the flue gases, the aqueous solution which is brought out of contact with the gases may be oxidized completely in a separate vessel. This oxidation may be effected by means of gases containing oxygen, such as air, or electrolytically.

If the completion of the oxidation is carried out electrolytically, the solution should preferably contain a soluble chloride such as ammonium chloride. The chlorine ion appears to possess a function, in the electrolysis, analogous to that of an oxygen carrier. The process of oxidizing an aqueous solution containing ammonium sulphite by first bringing it into contact with an oxidizing gas such as air or hot products of combustion and then completing the oxidation eletrolytically and the process of oxidizing, by electrolysis, an aqueous solution containing ammonium sulphite and a soluble chloride, preferably ammonium chloride, are described and claimed in a co-pending application filed concurrently herewith.

If the completion of the oxidation is carried out by means of oxygen-containing gases such as air, the solution should contain an effective catalyst. Heavy metal salts appear to act as catalysts under suitable conditions of acidity or alkalinity. Manganeous salts, cuprous chloride, cobalt salts such as cobalt chloride, or iron salts, preferably in the ferrous state, may be employed under appropriate conditions. It is, therefore, necessary to determine the degree of acidity or alkalinity of the solutions at which the catalysts are most effective since any substantial variation from the optimum conditions may reduce or nullify entirely the catalytic influence of the heavy metal compound. Generally speaking the conditions must at least ensure that the catalyst is maintained entirely in solution. When employing cobalt salts as catalysts the solution must also be kept definitely alkaline until the completion of the oxidation. An alkalinity corresponding to a pH value of at least 8 appears to be necessary.

Cobalt salts appear less desirable for use as catalysts than iron salts for several reasons. In the first place difficulties have been encountered in securing complete oxidation with the aid of cobalt salts in presence of high concentrations of sulphate of ammonia. When sulphate of ammonia is to be recovered from the aqueous solutions, it is necessary to oxidize the ammonium sulphite in presence of a high concentration of sulphate of ammonia, e. g. up to about 400 grams per litre of solution, in order to minimize any subsequent evaporation operation which may have to be performed. Again the essential condition of alkalinity appears to preclude the possibility of employing cobalt salts in the stage where the flue gases are treated since acidity of the liquors leaving this stage is necessary to prevent loss of ammonia. Although cobalt compounds may be employed in a subsequent stage for completing the oxidation of the ammonium sulphite, when this has not been done by the flue gases, the free ammonia which must be present in solution is carried away to a very large extent by the oxidizing gases. If necessary it can be recovered by absorption. Preferably, however, when employing a cobalt catalyst in this way, the used oxidizing gases carrying free ammonia are fed, wholly or in part, into the untreated flue gases to neutralize or assist in neutralizing the oxides of sulphur contained therein.

The preferred catalysts to employ consist of ferrous salts which may be added to the liquors as such, e. g. in the form of ferrous sulphate, or introduced by bringing the liquors into contact with metallic iron, e. g. the internal surfaces of the apparatus. Iron salts appear to be effective only in distinctly acid solutions, that is to say solutions in which the pH value does not exceed about 6. Thus ferrous compounds may be present in the solution when it is in contact with the flue gases and, under the conditions then prevailing, will have a catalytic influence on the oxidation. It is to be noted, however, that the behaviour of the iron is influenced by temperature. About 50° C. appears to be the maximum permissible temperature to which solutions containing ammonium sulphite and iron salts should be exposed. It is preferred, however, to maintain the temperature of such solutions below about 40° C. since at these lower temperatures the solutions are relatively stable even with slight variations in acidity. At temperatures of the order of 50° C. and upwards precipitation of the iron occurs somewhat too readily if the pH value of the solution rises, even momentarily, above about 6. It is not satisfactory to attempt to remedy this by increasing the acidity as loss of sulphur dioxide may then result.

Since, however, the process may be operated with the aqueous solution at a temperature up to 50° C., for example, the flue gases are not cooled to an inconvenient extent. The cooling which does occur does not result in a proportionate increase in density on account of the water vapour which is taken up; the treated gases accordingly rise and disperse easily in the surrounding atmosphere.

The invention includes suitable apparatus for carrying out the process, which is illustrated on the accompanying drawing as consisting of a vertical tower 10 having an inlet 11 for flue gases near the top and an outlet 12 for flue gases near the bottom, an inlet 13 for aqueous solution near the top and a sump 14 and outlet 15 for aqueous solution near the bottom, and internal baffles 16 or the like for bringing the aqueous solution into contact with the flue gases, in combination with a receptacle or receptacles 17 connected by pipes 18 and 19 to the solution inlet and outlet and a pump 20 whereby solution may be circulated through the tower. Preferably a fan 21 is provided at the outlet side to draw or assist in drawing the flue gases through the tower.

In the preferred form of the invention the flue gases are caused to pass down a vertical tower which may, if desired, be packed or provided with baffles, for example wooden slats. The flue gases and liquor are both introduced near the top so that the gases first come into contact with the most alkaline liquor. The entering liquor is rendered alkaline by continuous addition of ammonia either as gas or in solution (e. g. as crude ammonia liquor), but a large excess of ammonia is avoided. The absorption of oxides of sulphur is so rapid that the time of contact between the flue gases and the absorbing liquid need only be of the order of about one second. With a determined quantity of free ammonia and proportion of oxides of sulphur in the flue gases, the rates of flow of the gases and of the liquor are so maintained that the gases are substantially entirely stripped of their oxides of sulphur before reaching the bottom of the tower and the liquor on leaving the bottom of the tower is distinctly acid, the pH value not exceeding about 6.

To facilitate the oxidation in the tower of the ammonium sulphite, iron may be introduced into the liquor either in the form of an aqueous solution of ferrous sulphate or by providing surfaces of metallic iron in the tower. The ammonium sulphite is thus oxidized in the tower wholly or in part to sulphate of ammonia. The solution removed from the bottom of the tower, after completion of the oxidation if necessary either by means of air or electrolytically, is again rendered alkaline with ammonia and returned to the top of the tower, fresh catalyst being introduced into the solution if necessary.

The hot flue gases remove a substantial proportion of water from the liquors thus increasing the concentration of sulphate of ammonia and hastening the attainment of a concentration at which it may be easily recovered by crystallization, either intermittently from the whole body of liquor or continuously by withdrawing a small proportion of the liquor from the circuit. The liquors to be crystallized may be treated in any suitable manner for removal of the dissolved iron or other catalyst, if such removal has not already been effected by the existing conditions.

The liquor so removed may be replaced by water either added as such or introduced with the added ammonia, or both.

The liquors removed from the tower are preferably settled or otherwise treated by known means for the removal of the solid particles which may have been separated from the gases by the liquors. These particles readily deposit, on standing, in the form of a sludge which can be drawn off intermittently as necessary.

The amount of catalyst which is necessary may be indicated, by way of example only, as about one part by weight of iron to 50 parts by weight of ammonium sulphite to be oxidized.

The internal surfaces of the tower may be formed of or coated with material resistant to attack by the liquors e. g. any known acid-resisting material such as "alloy" steels having acid resisting properties. If it is desired to introduce iron as a catalyst for a subsequent oxidation with oxygen-containing gases such as air the liquor on leaving the tower may be passed through a vessel containing scrap-iron.

To assist the passage of the flue gases through the tower an exhaust fan of the usual type may be employed.

By operating in the manner described above the hot flue gases can be substantially entirely stripped of their content of oxides of sulphur without lowering their temperature to any inconvenient extent. Moreover since the absorption is very rapid and complete the volume of liquor required and hence the size of plant necessary are quite small in comparison with the volume of gases treated. The treatment of the gases in co-current with the liquor is an important feature for the reason that the oxides of sulphur first come into contact with the liquor most capable of absorbing them and also they pass out of contact with the liquors at a point where the oxidation of the ammonium sulphite is most complete so that there is little or no tendency for any sulphur dioxide to be carried away by possible hydrolysis or dissociation of the ammonium sulphite; moreover the liquors may be maintained slightly acid at the point where the gases pass out of contact with them, thus guarding against loss of ammonia.

By way of example, in treating flue gases containing 0.06% of sulphur dioxide and 9% of free oxygen the gases may be passed downwards through a protected iron tower of capacity 210 cubic feet at the rate of 60,000 cubic feet per hour. An aqueous solution containing 33% of sulphate of ammonia and free ammonia, which is continuously added at a rate equivalent to the sulphur dioxide in the flue gas, (about 3.5 lbs. of free ammonia per hour), is fed downwards through the tower in co-current with the gas at the rate of 1000 gallons per hour. The solution emerging from the bottom of the tower contains no free ammonia and has a pH value of approximately 6. The temperature of the incoming gas is 200° C. and the temperature of the outgoing gas is 45° C. The temperature of the incoming and outgoing liquor is about 45° C. The outgoing gas is substantially free from sulphur dioxide and sulphur trioxide and contains no free ammonia.

We declare that what we claim is:—

1. Process for removing oxides of sulphur from flue gases containing free oxygen which consists in passing said gases continuously through a chamber and continuously passing an aqueous solution containing ammonia through said chamber in co-current contact with said gases.

2. Process for removing oxides of sulphur from flue gases containing free oxygen which consists in passing said gases continuously through a chamber and continuously passing an aqueous solution of sulphate of ammonia containing ammonia through said chamber in co-current contact with said gases.

3. Process as claimed in claim 1 in which said aqueous solution while in contact with said flue gases contains a ferrous salt in solution.

4. Process as claimed in claim 2 in which said aqueous solution while in contact with said flue gases contains a ferrous salt in solution.

5. Process for removing oxides of sulphur from flue gases containing free oxygen which consists in passing said gases continuously through a chamber and continuously passing an aqueous solution containing sulphate of ammonia and ammonia through said chamber in co-current contact with said gases and in contact with surfaces of metallic iron.

6. Process for removing oxides of sulphur from flue gases containing free oxygen which consists in feeding said flue gases into a chamber, feeding an aqueous solution containing sulphate of ammonia and ammonia into said chamber in co-current contact with said flue gases, withdrawing said flue gases from said chamber substantially devoid of oxides of sulphur and withdrawing said aqueous solution from said chamber in a slightly acid condition.

7. Process as claimed in claim 6 in which the aqueous solution withdrawn from said chamber is treated for removal of sulphate of ammonia formed therein, rendered alkaline by the addition of ammonia and again fed into said chamber in co-current contact with said flue gases.

8. Process for removing oxides of sulphur from flue gases containing free oxygen which consists in continuously feeding said flue gases into a chamber, continuously feeding an aqueous solution containing sulphate of ammonia and ammonia into said chamber in co-current contact with said flue gases, bringing said aqueous solution into contact with surfaces of metallic iron, withdrawing said flue gases from said chamber substantially devoid of oxides of sulphur, withdrawing said aqueous solution from said chamber in a slightly acid condition, separating sulphate of ammonia from said solution, adding ammonia to said solution and returning said solution to said chamber.

9. Process for removing oxides of sulphur from flue gases containing free oxygen which consists in passing said gases continuously through a chamber, continuously passing an aqueous solution containing ammonia into said chamber and into co-current contact with said gases, maintaining said co-current contact for sufficient time to cause oxidation of ammonium sulphate formed and continuously withdrawing said aqueous solution from said chamber.

10. Process for removing oxides of sulphur from flue gases containing free oxygen which consists in passing said gases continuously through a chamber, continuously passing an aqueous solution containing ammonia through said chamber in co-current contact with said gases and correlating the rates of passage of said aqueous solution and said gases with the quantity of ammonia and of oxides of sulphur respectively contained therein, so that the oxides of sulphur are substantially completely removed from said flue gases while said aqueous solution becomes slightly acid.

11. Process for removing oxides of sulphur from flue gases containing free oxygen which consists in passing said gases continuously through a chamber, continuously passing into said chamber and into co-current contact with said gases an aqueous solution containing sulphate of ammonia and ammonia, continuously removing from contact with said gases and from said chamber an aqueous solution containing no ammonia, removing from said solution sulphate of ammonia which has been formed in said chamber, adding ammonia to said solution from which sulphate of ammonia has been removed and returning said solution containing ammonia to said chamber.

12. Process for removing oxides of sulphur from flue gases containing free oxygen which consists in passing said gases continuously through a chamber, continuously passing an aqueous solution of sulphate of ammonia containing ammonia into said chamber and into co-current contact with said gases, maintaining said contact for sufficient time to cause oxidation of ammonium sulphite formed and continuously withdrawing said aqueous solution from said chamber.

13. Process as claimed in claim 11 in which the ammonia added to said solution consists of crude ammonia liquor.

14. Process as claimed in claim 9 in which said aqueous solution while in contact with said flue gases contains a ferrous salt in solution.

HENRY J. HODSMAN.
ALAN TAYLOR.